US011011936B2

(12) United States Patent
Costinett et al.

(10) Patent No.: US 11,011,936 B2
(45) Date of Patent: May 18, 2021

(54) SINGLE-STAGE TRANSMITTER FOR WIRELESS POWER TRANSFER

(71) Applicant: University of Tennessee Research Foundation, Knoxville, TN (US)

(72) Inventors: Daniel Jes Costinett, Knoxville, TN (US); Ling Jiang, Knoxville, TN (US)

(73) Assignee: UNIVERSITY OF TENNESSEE RESEARCH FOUNDATION, Knoxville, TN (US)

(*) Notice: Subject to any disclaimer, the term of this patent is extended or adjusted under 35 U.S.C. 154(b) by 11 days.

(21) Appl. No.: 16/483,287

(22) PCT Filed: Mar. 14, 2017

(86) PCT No.: PCT/US2017/022316
§ 371 (c)(1),
(2) Date: Aug. 2, 2019

(87) PCT Pub. No.: WO2018/169520
PCT Pub. Date: Sep. 20, 2018

(65) Prior Publication Data
US 2020/0014245 A1    Jan. 9, 2020

(51) Int. Cl.
*H02M 5/458* (2006.01)
*H02J 50/12* (2016.01)
(Continued)

(52) U.S. Cl.
CPC .............. *H02J 50/12* (2016.02); *H02M 1/083* (2013.01); *H02M 1/4208* (2013.01);
(Continued)

(58) Field of Classification Search
CPC ...... H02J 50/12; H02M 1/083; H02M 1/4208; H02M 5/4585; H02M 7/217; H02M 7/5387; H02M 2001/007; H02M 2007/4815
See application file for complete search history.

(56) References Cited

U.S. PATENT DOCUMENTS 9,276,413 B1 * 3/2016 Zhang .................... H02J 50/12
2006/0072353 A1   4/2006 Mhaskar
(Continued)

FOREIGN PATENT DOCUMENTS

CN        1437310       8/2003
CN        205196033     4/2016

OTHER PUBLICATIONS

PCT Written Opinion of the International Searching Authority issued for corresponding PCT International Application No. PCT/US2017/022316, dated Jun. 14, 2017 (6 pages).
(Continued)

*Primary Examiner* — Gary L Laxton
(74) *Attorney, Agent, or Firm* — Myers Bigel, P.A

(57) ABSTRACT

A single-stage transmitter for wireless power transfer is provided. The transmitter includes a rectifier stage and an inverter stage sharing a first phase leg. The rectifier stage further includes a rectifying leg including two diodes connected in series, and a boost inductor coupling the first phase leg and the rectifying leg to an input port. The inverter stage further includes a second phase leg. Each phase leg includes two switches connected in series. The first and second phase legs are coupled to an output port. A bus capacitor is coupled across the first phase, second phase, and rectifying legs. A controller is programmed to determine first and second parameters, based on an output power at the output port, to simultaneously control the rectifier stage and the inverter
(Continued)

stage to maintain constant bus voltage and achieve high power factor and low total harmonic distortion at the input port.

18 Claims, 19 Drawing Sheets

(51) Int. Cl.
    *H02M 1/08* (2006.01)
    *H02M 1/42* (2007.01)
    *H02M 7/217* (2006.01)
    *H02M 7/5387* (2007.01)
    *H02M 1/00* (2006.01)
    *H02M 7/48* (2007.01)

(52) U.S. Cl.
    CPC ......... *H02M 5/4585* (2013.01); *H02M 7/217* (2013.01); *H02M 7/5387* (2013.01); *H02M 2001/007* (2013.01); *H02M 2007/4815* (2013.01)

(56) References Cited

U.S. PATENT DOCUMENTS

2011/0273909 A1   11/2011   Christopher
2016/0359369 A1*  12/2016   Jeong ..................... H02J 50/12

OTHER PUBLICATIONS

PCT International Search Report issued for corresponding PCT International Application No. PCT/US2017/022316, dated Jun. 14, 2017 (3 pages).

* cited by examiner

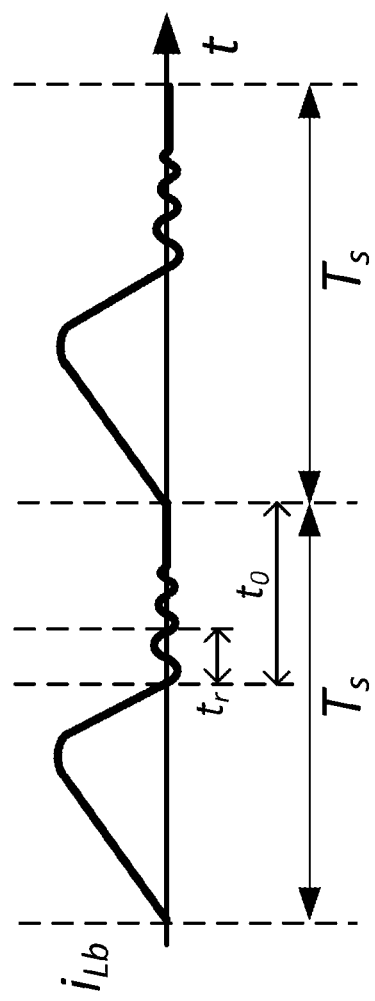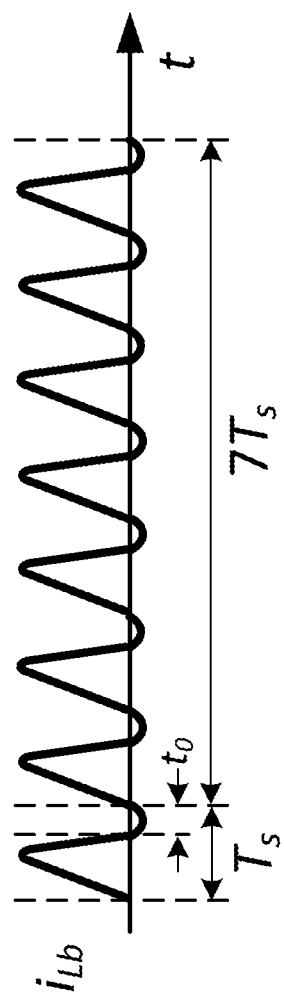

SINGLE-STAGE TRANSMITTER FOR WIRELESS POWER TRANSFER

STATEMENT REGARDING FEDERALLY SPONSORED RESEARCH OR DEVELOPMENT

This invention was made with government support under EEC-1041877 awarded by the U.S. National Science Foundation and the U.S. Department of Energy. The U.S. Government has certain rights in this invention.

CROSS REFERENCE TO RELATED APPLICATION

This application is a 35 U.S.C. § 371 national stage application of PCT International Application No. PCT/US2017/022316, filed on Mar. 14, 2017, the content of which is incorporated herein by reference in its entirety. The above-referenced PCT International Application was published in the English language as International Publication No. WO 2018/169520 A1 on Sep. 20, 2018.

BACKGROUND

The present disclosure generally relates to power converters for wireless power transfer (WPT). More specifically, the present disclosure relates to a single-stage transmitter for WPT.

There has been an increasing interest in WPT due to its high flexibility in transferring power from one point to another. WPT may be achieved by radiative transfer for long transfer distances, or through magnetic or electric coupling in near-field applications. One approach to magnetically-coupled WPT is through magnetic resonant coupling, which typically operates in the megahertz frequency range and is mainly applied to consumer electronics such as mobile phones, household equipment, and portable devices.

FIG. 1 illustrates an architecture of a typical WPT system 100, which is made of a transmitter 110, a magnetically-coupled coil 120, and a receiver 130. The transmitter 110 comprises three power conversion stages, namely an alternating current-to-direct current (AC/DC) rectifier 112 to convert utility line-frequency AC power 102 to DC, a DC/DC converter 116 to convert DC voltage to a desired DC bus voltage, and a DC/AC inverter 118 to convert the DC bus voltage to a high-frequency AC current $I_p$ to drive the transmitter coil 122. To comply with the Alliance for Wireless Power (A4WP) standard, a constant 6.78-MHz AC output with low harmonic current has to be provided. The transmitter 110 may also include a power factor correction (PFC) circuit 114 to ensure that an input current $I_{in}$ complies with the limits for harmonic current emissions prescribed by the IEC 61000-3-2 standard. According to the IEC 61000-3-2 standard, the PFC circuit 114 is only required for a system having rated power larger than 75 W. Power is wirelessly transferred to the receiver 130 through the magnetic coupling between the transmitter coil 122 and the receiver coil 124, inducing a high-frequency AC current $I_s$, which is typically rectified by a AC/DC rectifier 132 and converted by a DC/DC charger 134 to charge a battery 136. The receiver 130 may be incorporated in a device to be charged. Alternatively, the AC/DC rectifier 132 and the DC/DC charger 134 may be external to the device.

The WPT system 100 architecture has merits in the decoupling of individual converter functions. Each conversion stage may be designed to employ the best individual devices (e.g., parasitic and switching components) for specific ratings and a specific control scheme. However, the WPT system 100 architecture exhibits low end-to-end power conversion efficiency due to the number of cascaded conversion stages. The power conversion efficiency of a system such as the WPT system 100 is between 50% and 70%.

To improve efficiency, topologies that combine the AC/DC rectifier 112 and the PFC circuit 114, and eliminate the DC/DC converter 116 have been investigated. For example, FIG. 2 illustrates an architecture of a WPT system 200 having a two-stage transmitter 210 with an AC/DC rectifier with PFC 213 cascaded with a DC/AC inverter 218. The coil 220 operates similarly to the coil 120, and the receiver of the WPT system 200 has been omitted in FIG. 2. The WPT system 200 architecture has been shown to achieve higher power conversion efficiency than the WPT system 100 architecture.

Since cascaded structures have significant impact on power conversion efficiency, to further improve efficiency, it is desirable for a WPT system to have a single-stage transmitter. For example, FIG. 3 illustrates a WPT system architecture that has a single-stage transmitter 310 with an AC-to-AC (AC/AC) converter 315 to convert power from line-frequency AC at the input to high-frequency AC at the output for wireless power transfer.

Recently, single-stage topologies have been studied and implemented in different applications. For instance, U.S. Pat. No. 9,276,413 discloses a soft-switched single-stage converter for WPT. However, PFC was not required in this application. A single-stage electronic ballast for high-intensity discharge (HID) lamps, comprising an integrated boost PFC and full bridge inverter, is described in "Single stage electronic ballast for HID lamps," by M. Brumatti, et al., *Industry Applications Conference Record*, 2003, 339-344, vol. 1, and in "Utility frequency AC to high frequency AC power converter with boost-half bridge single stage circuit topology," by B. Saha, et al., *IEEE International Conference on Industrial Technology*, 2006, 1430-1435. However, a full bridge diode rectifier, which is used at the input, increases conduction losses and thus negatively affects power conversion efficiency. A single-stage topology is developed by combining a bridgeless totem pole PFC and half bridge inverter for AC LED applications in "Single-stage high power-factor bridgeless AC-LED driver for lighting applications," by G. C. Tseng, et al., *International Conference on Renewable Energy Research and Applications*, 2012, 1-6. This topology eliminates the full bridge diode rectifier, but a control scheme for regulating power across a wide load range is not disclosed. A single-stage AC/AC converter for high-frequency induction heating application is introduced in "ZVS Phase Shift PWM-Controlled Single-Stage Boost Full Bridge AC-AC Converter for High Frequency Induction Heating Applications," by T. Mishima, et al., *IEEE Transactions on Industrial Electronics*, vol. 64, no. 3, pp. 2054-2061, March 2017 (hereinafter "Mishima 1"), and in "A novel bridgeless boost half-bridge ZVS-PWM single-stage utility frequency AC-high frequency ac resonant converter for domestic induction heaters," by T. Mishima, et al., *International Power Electronics Conference*, 2014, 2533-2540 (hereinafter "Mishima 2"). In Mishima 1 and Mishima 2, a totem pole rectifier integrated with a full bridge or a half bridge resonant inverter is used to convert line-frequency AC to high-frequency AC output power. In Mishima 1, a constant switching frequency and constant duty cycle with continuous conduction mode (CCM) modulation is implemented in the totem pole rectifier, and a second phase leg is used to control output power by providing phase shift. In Mishima 2, a constant switching frequency with CCM modulation is implemented in the rectifier, and output power is controlled by asymmetric duty cycle. However, operations in Mishima 1 and Mishima 2 are not suitable for WPT application, since double line-frequency harmonics are present at the output of the transmitter.

Therefore, to meet the requirements of WPT application and serve a wide load range that includes power ratings higher than 75 W, the inventors recognized a need in the art for a single-stage transmitter that is capable of convening power from line-frequency AC to 6.7X-MHz AC, with simultaneous input PFC and output power regulation.

BRIEF DESCRIPTION OF THE DRAWINGS

FIGS. 16A and 16B illustrate typical inductor current waveforms, according to embodiments of the present disclosure.

DETAILED DESCRIPTION

Embodiments of the present disclosure provide a single-stage transmitter for a wireless power transfer (WPT) system and methods for controlling the same. The transmitter includes a rectifier stage and an inverter stage sharing a first phase leg. The rectifier stage further includes a rectifying leg including two diodes connected in series, and a boost inductor coupling the first phase leg and the rectifying leg to an input port of the transmitter. The inverter stage further includes a second phase leg. Each of the first and second phase legs includes two switches connected in series. The first and second phase legs are coupled to an output port of the transmitter. A bus capacitor is coupled across the first phase leg, the second phase leg, and the rectifying leg. A controller is programmed to determine first and second parameters, based on an output power at the output port, to simultaneously control the rectifier stage and the inverter stage to maintain a constant bus voltage and achieve high power factor and low total harmonic distortion at the input port.

Figure 4:
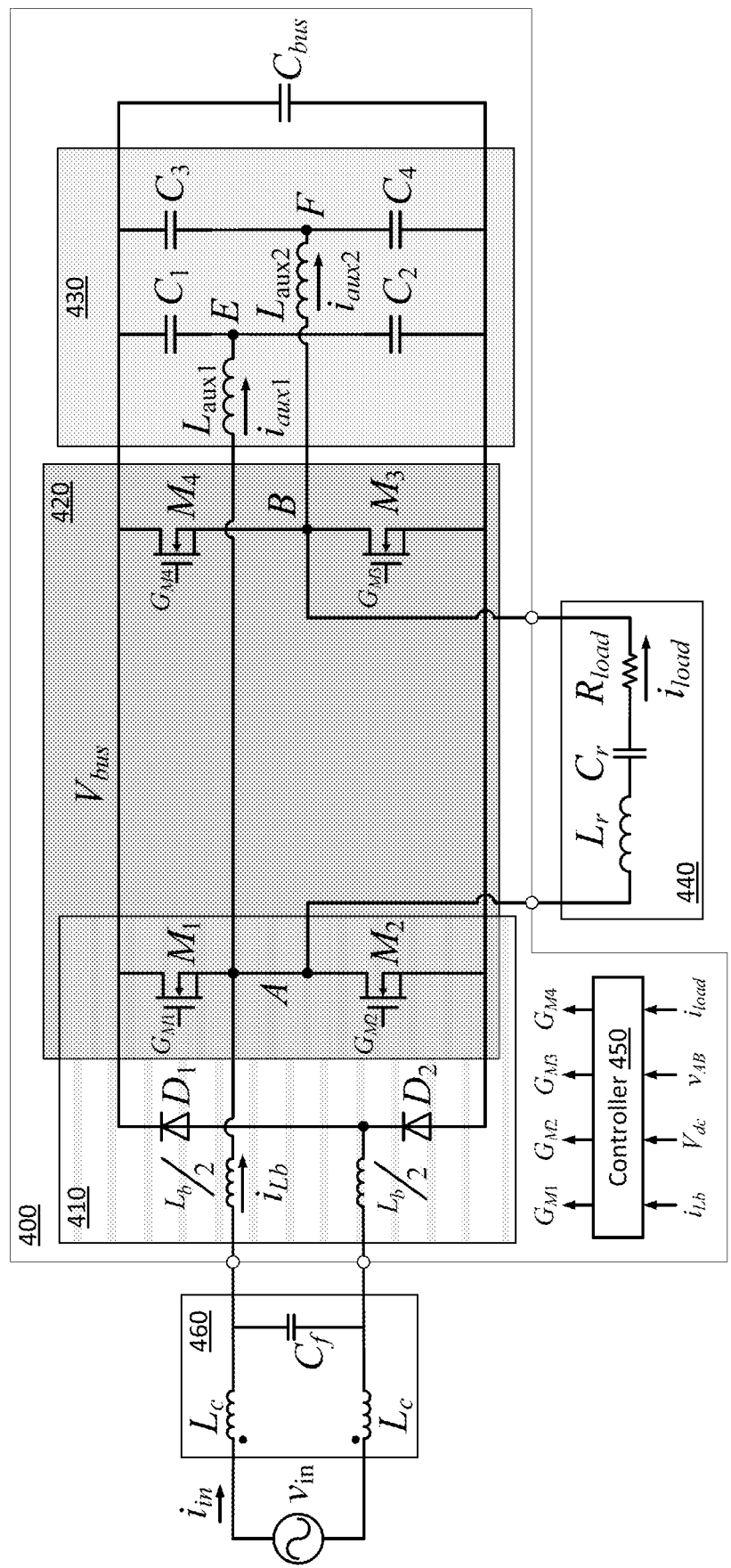
FIG. 4 illustrates a single-stage transmitter of a WPT system, according to an embodiment of the present disclosure.

FIG. 4 illustrates a single-stage transmitter 400 for WPT system, according to an embodiment of the present disclosure. The transmitter 400 provides a single power conversion stage by integrating a rectifier 410 and an inverter 420. The rectifier 410 is a bridgeless totem pole rectifier and the inverter 420 is a high-frequency resonant full bridge inverter. The rectifier 410 includes a boost inductor $L_b$, which may be split between the two input legs as illustrated in FIG. 4, diodes $D_1$ and $D_2$, and transistors $M_1$ and $M_2$, forming a bridgeless power factor correction (PFC) boost converter and may be operated to convert utility line-frequency alternating current (AC) input voltage $v_{in}$ to a predetermined direct current (DC) bus voltage $V_{bus}$ across a bus capacitor $C_{bus}$. Examples of transistors for the transistors $M_1$ and $M_2$ are metal-oxide-semiconductor field-effect transistors (MOSFETs) and gallium nitride field-effect transistors (GaNFETs). The diodes $D_1$ and $D_2$ may be substituted with actively-controlled switches, such as MOSFETs. The inverter 420 is formed by the transistors $M_1$-$M_4$, and may be operated to generate a 6.78-MHz AC output.

Figure 1:
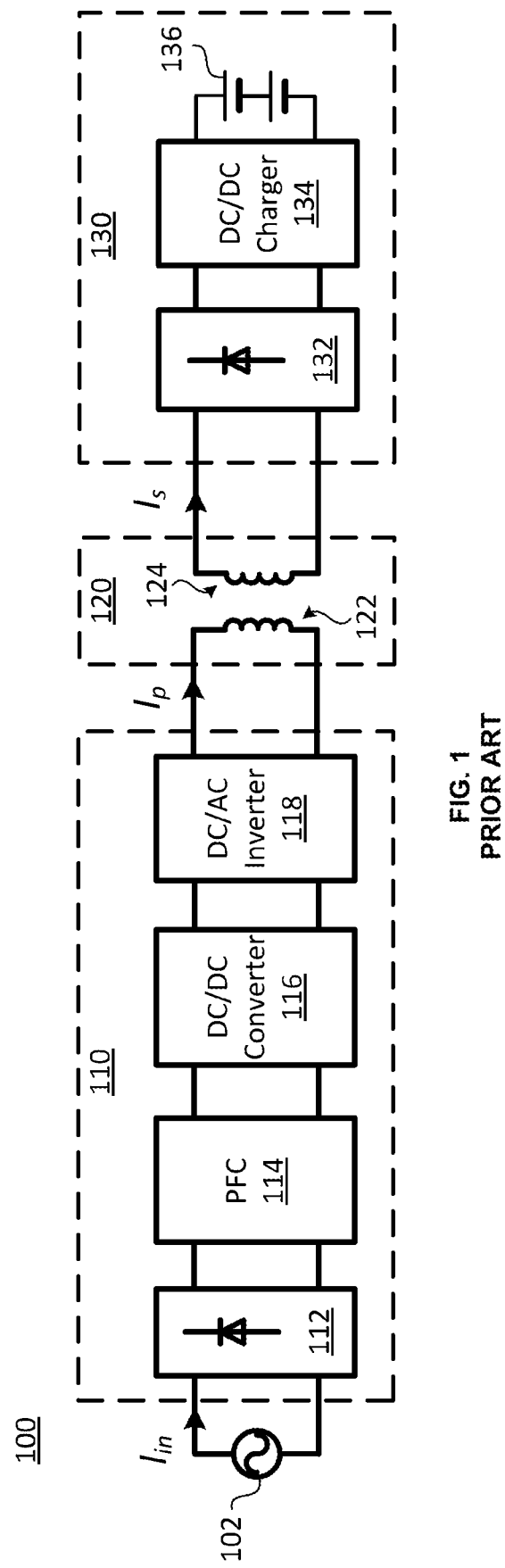
FIG. 1 illustrates an architecture of a typical wireless power transfer (WPT) system, according to an embodiment of prior art.
Figure 2:
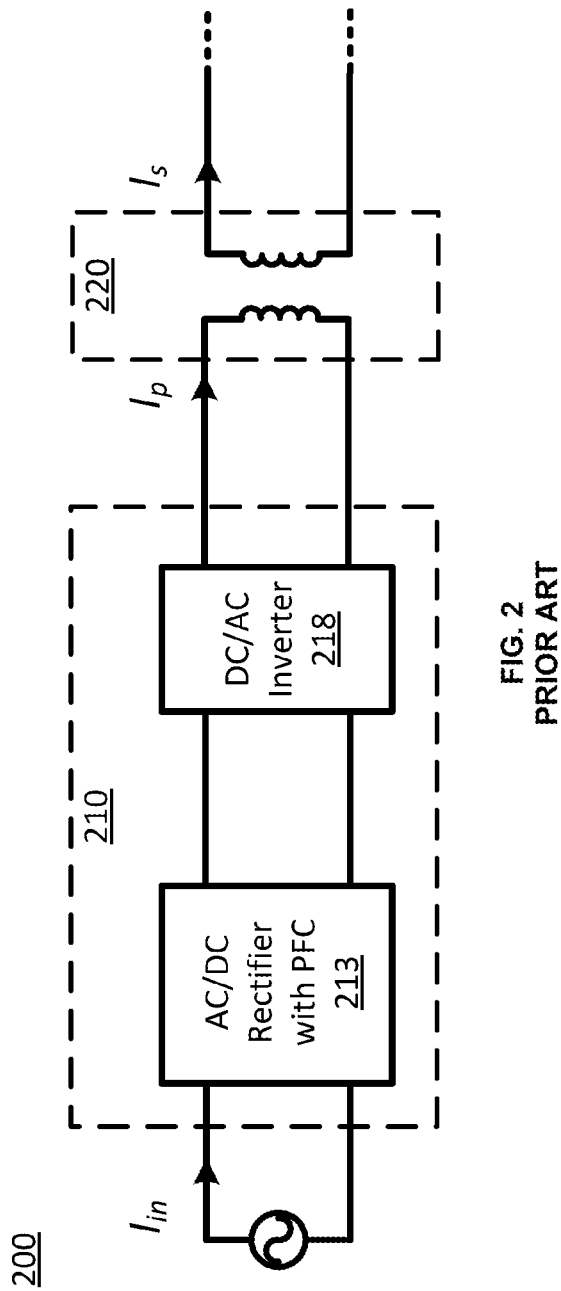
FIG. 2 illustrates an architecture of a two-stage transmitter of a WPT system, according to an embodiment of prior art.
Figure 3:
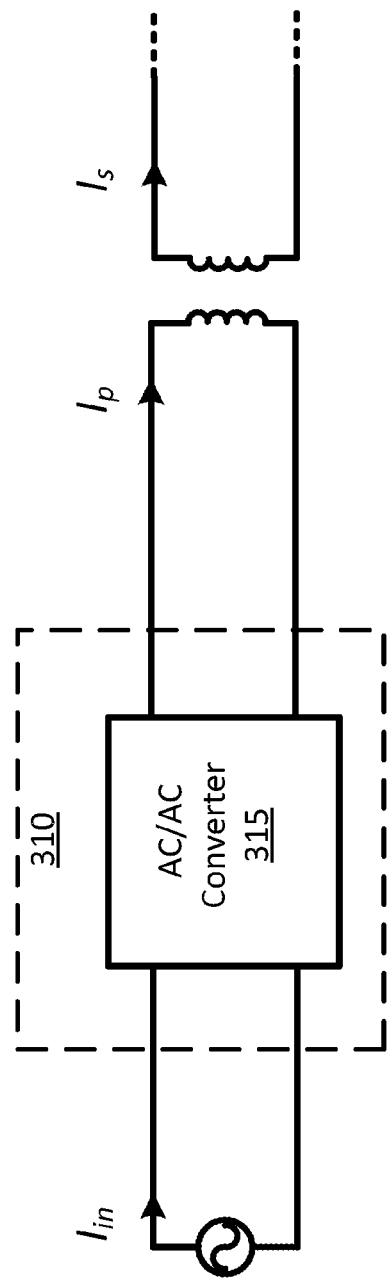
FIG. 3 illustrates an architecture of a single-stage transmitter of a WPT system, according to an embodiment of the present disclosure.

The transistors $M_1$ and $M_2$ are electrically coupled at a node A to form a first phase leg (also referred to as phase leg A herein), which is shared between the rectifier 410 and the inverter 420 and which provides functionality for both the rectifier 410 and the inverter 420. The transistors $M_3$ and $M_4$ are coupled at a node B to form a second phase leg (also referred to as phase leg B herein). Examples of transistors for the transistors $M_3$ and $M_4$ are MOSFETs and GaNFETs. As shown in FIG. 4, a load 440 is connected between the nodes A and B, and includes an inductor $L_r$, a capacitor $C_r$, and a resistor $R_{load}$, connected in series. The load 440 may model a load that is typically seen by the transmitter 400 and that may include a magnetically-coupled coil and a receiver of the WPT system (e.g., the magnetically-coupled coil 120 and the receiver 130 in FIG. 1). The inductor $L_r$ and the capacitor $C_r$ may be tuned to a 6.78-MHz resonant frequency.

The transmitter 400 may also include a zero voltage switching (ZVS) tank 430. The ZVS tank 430 comprises inductors $L_{aux1}$ and $L_{aux2}$, and capacitors $C_1$, $C_2$, $C_3$, and $C_4$. As illustrated in FIG. 4, the capacitors $C_1$ and $C_2$ are coupled at one end at a node F, which is coupled to the node A through the inductor $L_{aux1}$. The other ends of capacitors $C_1$ and $C_2$ are coupled across the bus capacitor $C_{bus}$. The inductor and capacitors $C_1$ and $C_2$ being connected in such a fashion allows the transistors $M_1$ and $M_2$ achieve soft switching. Similarly, the capacitors $C_3$ and $C_4$ are connected at one end at a node F, and the other ends across the bus capacitor C. The node F is coupled to the node B through the inductor $L_{aux2}$ to allow the transistors $M_3$ and $M_4$ achieve soft switching. Soft switching helps to improve the power conversion efficiency of the transmitter 400 by circulating currents away from the transistors $M_1$-$M_4$ when the transistors $M_1$-$M_4$ are being switched, thus reducing or eliminating switching power losses.

The transmitter 400 may further include a controller 450 to generate gate signals $G_{M1}$-$G_{M4}$ for the transistors $M_1$-$M_4$, respectively, based on one or more of the inductor current the bus voltage $V_{bus}$, an inverter output voltage $v_{AB}$ across nodes A and B, and a load current $i_{load}$ flowing through the load 440. The inductor current $i_{Lb}$, the bus voltage $V_{bus}$, the inverter output voltage $v_{AB}$, and the load current $i_{load}$ may be sensed by a variety of sensors that are known in the art and that are not shown in FIG. 4. The controller 450 may include a microprocessor (e.g., a digital signal processor (DSP)) and a memory to allow for non-volatile or volatile storage of instructions to be executed by the microprocessor and/or storage of lookup tables to be invoked by the microprocessor.

In FIG. 4, the inductor-capacitor network 460, which is shown as including magnetically-coupled inductors $L_c$ and a capacitor $C_f$, may represent parasitic inductances and capacitances between the input source and the rectifier 410 and/or an input filter provided at the input of the rectifier 410.

Operation of the transmitter 400 will now be described by first examining the operation of the rectifier 410, based on which and given the shared phase leg A, a control space may be identified for simultaneous regulation of both the rectifier 410 and the inverter 420.

Rectifier Operation

The rectifier 410 of the transmitter 400 is designed to provide PFC with an input current $i_{in}$ that has minimal total harmonic distortion (THD) to comply with the limits for harmonic current emissions prescribed by the IEC 61000-3-2 standard. The rectifier 410 is also to operate concurrently with the transistors $M_3$ and $M_4$ of the inverter 420 to generate a 6.78-MHz AC output to comply with the A4 WP standard.

In general, the rectifier 410 may be operated in continuous conduction mode (CCM), critical conduction mode (CRM), or discontinuous conduction mode (DCM). Although CRM may facilitate soft-switching without additional elements to the circuitry (e.g., the ZVS tank 430), CRM requires a variable switching frequency, which may not be easily adapted and integrated with the operation of the inverter 420. On the other hand, CCM requires additional active feedback control to achieve PFC with low THD at the input, exacerbating the requirements for circulating currents for soft switching and resulting in undesirable conduction losses. Moreover, variable duty cycle is required during each line period to maintain a constant bus voltage $V_{bus}$, thereby significantly increasing the control complexity of the inverter 420. Therefore, DCM operation is selected for this WPT application since it allows for constant switching frequency and constant duty cycle over each line period, and near-ZVS operation.

The time-varying input voltage $v_{in}$ to the rectifier 410 may be represented as $$v_{in}(t) = V_m \cdot \sin(2\pi f_{line} \cdot t) \quad (1)$$

where $V_m$ is the peak value of the input voltage $v_{in}$, $f_{line}$ is the line frequency, and t is time. The time-varying input current $i_{in}$ of an ideal DCM boost converter may be represented as $$i_{in}(t) = \left( \frac{1}{2L_b} \cdot \frac{T_{on}^2 \cdot f_s}{1 - \frac{v_{in}(t)}{V_{bus}}} \right) \cdot v_{in}(t) \quad (2)$$

where $f_s$ is the switching frequency of the transistors $M_1$-$M_4$, corresponding to a switching period $T_s$, and $T_{on}$ is the on-time of the main switch in the rectifier 410. When the polarity of input voltage $v_{in}$ is positive, the MOSFET $M_2$ is defined as the main switch. Otherwise, the MOSFET $M_1$ is the main switch.

Combining equations (1) and (2), and defining a modulation index M as $M=V_{bus}/V_m$ and a duty cycle d as $d=T_{on}/T_s$, the input current may be represented as:

$$i_{in}(t) = \frac{d^2 \cdot V_{bus}}{2 f_s \cdot L_b} \cdot \left( \frac{\sin(2\pi f_{line} \cdot t)}{M - \sin(2\pi f_{line} \cdot t)} \right) \quad (3)$$

According to equation (3), with the requirement that the switching frequency $f_s$ be constant, a power factor PF of unity may be obtained if d is made to vary sinusoidally with the input voltage $v_{in}$. However, this would increase the complexity of the control scheme of the transmitter 400. Accordingly, to simplify the control scheme, a constant duty cycle d may be used such that the THD and the PF remain within compliance. Thus, in this single-stage transmitter 400, DCM operation with a constant switching frequency $f_s$ and a constant duty cycle d is implemented.

The power factor PF may be defined as $$PF = \frac{P}{S} = \frac{\frac{1}{T_{line}} \int_0^{T_{line}} v_{in}(t) \cdot i_{in}(t) dt}{v_{in-rms} \cdot i_{in-rms}} \quad (4)$$

where P is active power, S is apparent power, $T_{line}$ is the line period, and $v_{in-rms}$ and $i_{in-rms}$ are the root-mean-square (rms) values of the input voltage $v_{in}$ and the input current respectively. Plugging equations (1) and (3) into equation (4), and with the line frequency $f_{line}$ being 60 Hz, the power factor PF may be represented as:

$$PF = \frac{\sqrt{\frac{2}{T_{line}} \int_0^{T_{line}} \frac{\sin^2(120\pi t)}{M - \sin(120\pi t)} dt}}{\int_0^{T_{line}} \left( \frac{\sin(120\pi t)}{M - \sin(120\pi t)} \right)^2 dt} \quad (5)$$

The power factor PF may also represented as $$PF = \frac{1}{\sqrt{1 + THD^2}} \cdot \cos\theta \quad (6)$$

where θ is the phase angle between the input current and the input voltage $v_{in}$. Ideally, the phase angle θ will be zero under DCM modulation. Thus, the THD value may be derived according to:

$$THD = \sqrt{\frac{1}{PF^2} - 1} \quad (7)$$

Figure 5A:
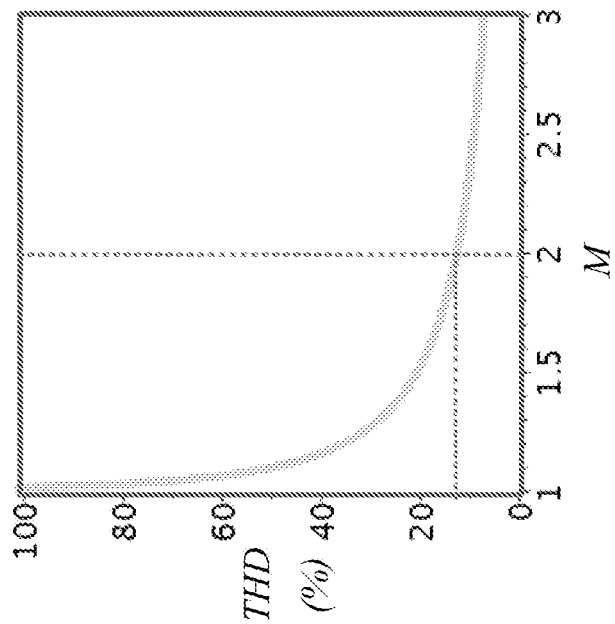
FIG. 5A is a plot of power factor versus modulation index, according to an embodiment of the present disclosure.
Figure 5B:
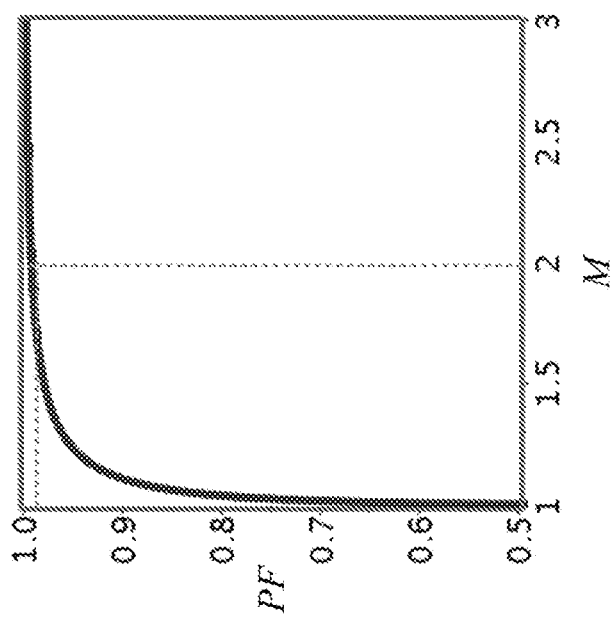
FIG. 5B is a plot of total harmonic distortion versus modulation index, according to an embodiment of the present disclosure.

According to equations (5) and (7), the curves of the PF and the THD, as functions of the modulation index M, are shown in FIGS. 5A and 5B, respectively. As can be seen in FIGS. 5A and 5B, a larger modulation index M allows for a higher PF and a lower THD. However, a larger modulation index M results in a larger bus voltage $V_{bus}$, which undesirably increases voltage stress on the transistors $M_1$-$M_4$, the diodes $D_1$ and $D_2$. Accordingly, in this embodiment of the disclosure, a modulation index M of 2 is chosen for moderate bus voltage $V_{bus}$ and acceptable PF and THD.

According to the input voltage $v_{in}$ defined in equation (1) and the input current $i_{in}$ in equation (3), an input power $P_{in}$, to the transmitter 400 may be represented as:

$$P_{in} = \frac{1}{T_{line}} \int_0^{T_{line}} v_{in}(t) \cdot i_{in}(t) dt \quad (8)$$

$$= \frac{1}{T_{line}} \int_0^{T_{line}} \frac{d^2 \cdot V_{bus} \cdot V_m}{2 f_s \cdot L_b} \cdot \frac{\sin^2(2\pi f_{line} \cdot t)}{M - \sin(2\pi f_{line} \cdot t)} dt$$

According to equation (8), with the bus voltage $V_{bus}$, the input voltage peak value $V_m$, the switching frequency $f_s$, the inductance of the boost inductor $L_b$, the line frequency $f_{line}$, and the line period $T_{line}$ being known constant parameters, the duty cycle d has to change as the input power $P_{in}$ changes. In other words, as power requirement by the load 440 changes, the duty cycle d needs to be controlled to maintain a constant bus voltage $V_{bus}$. It is to be appreciated that the duty cycle d remains constant when power required by the load 440 is constant.

Furthermore, to maintain the DCM operation of the rectifier 410, the relation in equation (9) has to be satisfied.

$$d \leq 1 - \frac{1}{M} \quad (9)$$

Figure 6:
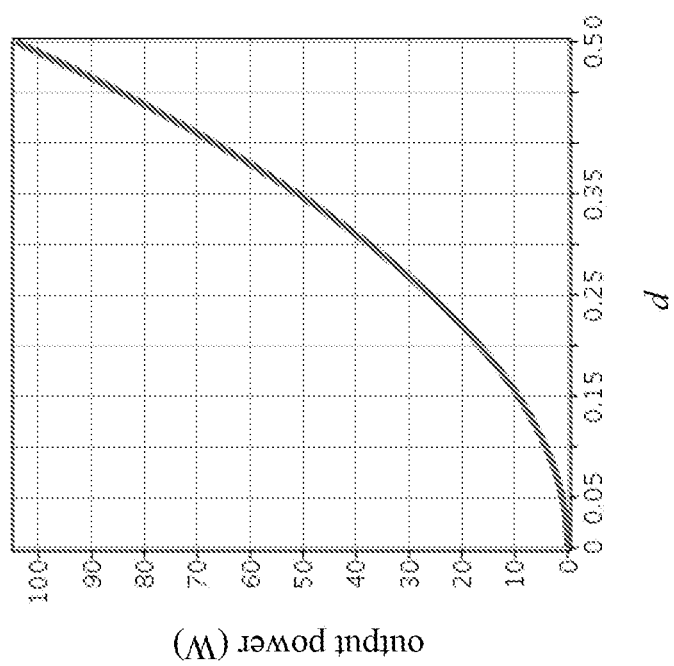
FIG. 6 is a plot showing an exemplary relationship between duty cycle and output power of the single-stage transmitter in FIG. 4.

As described above, in this embodiment, the modulation index M is chosen to be 2. Therefore, a duty cycle d≤0.5 should always be satisfied in the control scheme of the transmitter 400. With the chosen modulation index M and the range of duty cycle d, the boost inductor $L_b$ may be designed to ensure that the relation in equation (9) is satisfied under all operating conditions of the transmitter 400. Assuming a lossless transmitter 400 (i.e., the inverter 420 output power $P_o$ is equal to the input power $P_{in}$) and for a rated power of 100 W for the transmitter 400, FIG. 6 illustrates an exemplary relationship between the duty cycle d and the output power $P_o$ based on equation (8) such that a constant bus voltage $V_{bus}$ is maintained.

In the design of the rectifier 410, it is desired to keep the bus voltage G constant for three reasons. First, a constant bus voltage $V_{bus}$ simplifies the power control of the inverter 420. Second, a constant bus voltage $V_{bus}$, which indicates a fixed modulation index M based on a fixed input voltage $v_{in}$, can help the rectifier 410 maintain its desired performance. As described previously, a proper modulation index M is chosen to limit voltage stress on all the switches, while achieving an input current $i_{in}$ with high PF and low THD. Third, a constant bus voltage $V_{bus}$ facilitates the control of the magnitude of ZVS tank current.

Inverter Operation

The control objective of the inverter 420 is to regulate the output power $P_o$ required by the load 440. According to an embodiment of the present disclosure, the inverter 420 may be operated under an asymmetrical voltage cancellation (AVC) control to provide a full range of output power. The AVC control combines conventional phase-shift control and asymmetrical duty-cycle control to provide additional degrees of freedom such that both the rectifier 410 and the inverter 420 may be controlled concurrently.

Figure 7:
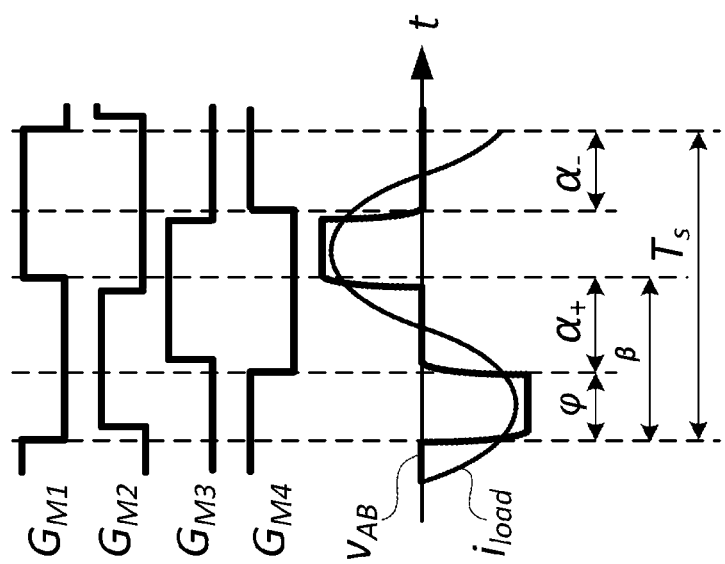
FIG. 7 shows exemplary ideal waveforms, along with control parameters, illustrating operation of the transmitter in FIG. 4.

FIG. 7 illustrates exemplary ideal waveforms of the gate signals $G_{M1}$-$G_4$, the inverter output voltage $V_{AB}$, and the load current $i_{load}$ over one switching period $T_s$, when the inverter 420 is modulated under the AVC control. In FIG. 7, parameters $\alpha_+$ and $\alpha_-$ are control angles for power regulation of the inverter 420, while the parameter β is the on-time period (in radians) of the rectifier 410. Thus, the duty cycle d of the rectifier 410 is d=β/2π. Additionally, the parameter φ is the phase shift between the phase legs A and B.

Figure 8:
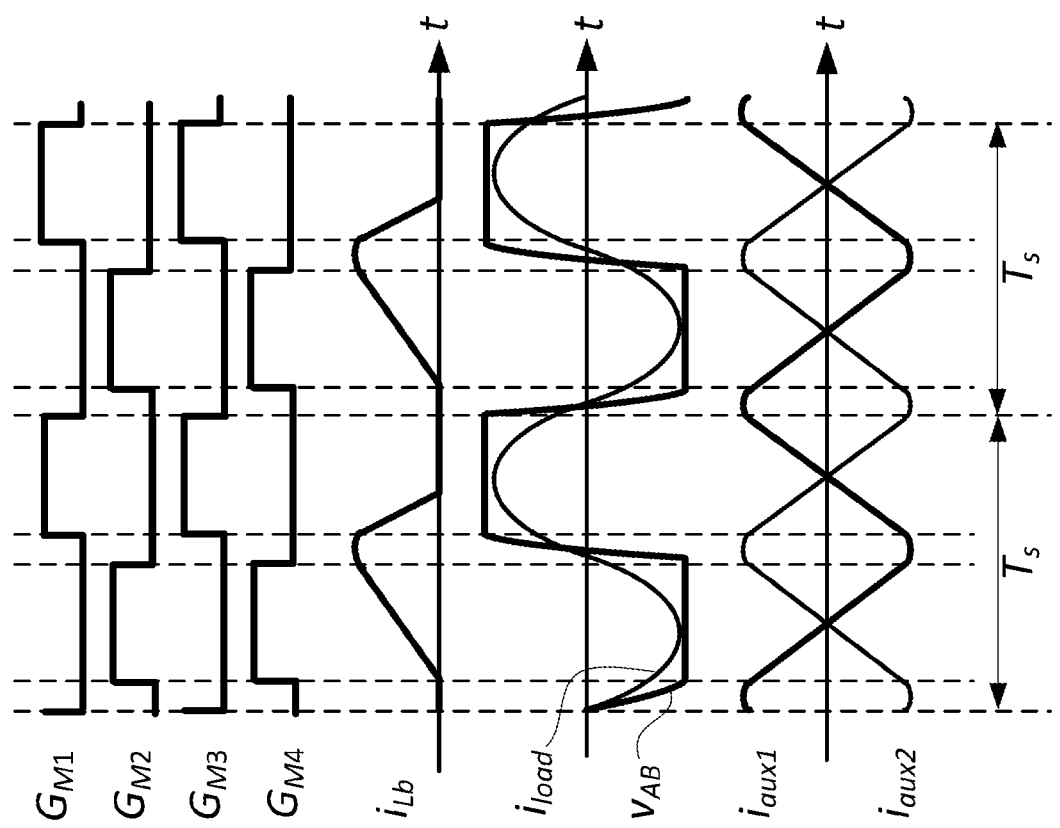
FIG. 8 shows exemplary ideal waveforms illustrating operation of the transmitter in FIG. 4 at full power.

Full power (i.e., rated power of the transmitter 400) occurs when $\alpha_+=\alpha_-=0$ and β=π. FIG. 8 illustrates the exemplary ideal waveforms of the gate signals $G_{M1}$-$G_{M4}$, the inductor current $i_{Lb}$, the inverter output voltage $v_{AB}$, the load current $i_{load}$, and currents $i_{aux1}$ and $i_{aux2}$ respectively flowing in inductors $L_{aux1}$ and $L_{aux2}$, during a positive line period and full power operation.

Under the AVC control, the fundamental harmonic peak value $V_{ab1}$ of the inverter output voltage $v_{AB}$ may be represented as $$V_{ab1} = \frac{V_{bus}}{\pi} \sqrt{a_1^2 + b_1^2} \quad (10)$$

$$a_1 = \sin(\beta - \alpha_+) + \sin(\beta) + \sin(\alpha_-) \quad (11)$$

$$b_1 = 1 - \cos(\beta - \alpha_+) - \cos(\beta) + \cos(\alpha_-) \quad (12)$$

The output power $P_o$ of the inverter 420 may thus be represented as $$P_o = \frac{V_{ab1}^2}{2 R_{load}} \quad (13)$$

Combining to equations (10)-(13), the output power $P_o$ may be explicitly represented as:

$$P_o = \frac{V_{bus}^2}{2\pi^2 \cdot R_{load}} \cdot \{[(\sin(\beta - \alpha_+) + \sin(\beta) + \sin(\alpha_-)]^2 + [1 - \cos(\beta - \alpha_+) - \cos(\beta) + \cos(\alpha_-)]^2\} \quad (14)$$

Overall Control Scheme

With the rectifier 410 and the inverter 420 operations described above, a set of equations (15) may be concatenated for the transmitter 400, where the transmitter 400 is assumed to be lossless, i.e., the output power $P_o$ is equal to the input power $P_{in}$.

$$\begin{cases} P_{in} = \frac{1}{T_{line}} \int_0^{T_{line}} \frac{d^2 \cdot V_{bus} \cdot V_m}{2f_s \cdot L_b} \cdot \frac{\sin^2(2\pi f_{line} \cdot t)}{\frac{V_{bus}}{V_m} - \sin(2\pi f_{line} \cdot t)} dt \\ P_o = \frac{V_{bus}^2}{2\pi^2 \cdot R_{load}} \cdot \left\{ \begin{array}{l} [(\sin(\beta - \alpha_+) + \sin(\beta) + \sin(\alpha_-)]^2 + \\ [1 - \cos(\beta - \alpha_+) - \cos(\beta) + \cos(\alpha_-)]^2 \end{array} \right\} \\ \beta = 2\pi \cdot d \\ P_{in} = P_o \end{cases} \quad (15)$$

In the set of equations (15), the bus voltage input voltage peak value $V_{in}$, the switching frequency the inductance of the boost inductor $L_b$, the resistance of the resistor $R_{load}$, the line frequency $f_{line}$, and the line period $T_{line}$ are known parameters. By linking the first and third equations of the set of equations (15), the rectifier on-time period 13 may be solved as a function of the input power $P_{in}$. Once the period β is solved, a relation among the control angles $α_+$ and $⊕_-$ and the output power $P_o$ (i.e., the power regulation constraint), may be expressed by the second equation of the set of equation (15).

For the output power regulation, the control angles $α_+$ and $α_-$ provide two degrees of freedom. Therefore, by defining different relations between the control angles $α_+$ and $α_-$, different control trajectories may be obtained.

Figure 9:
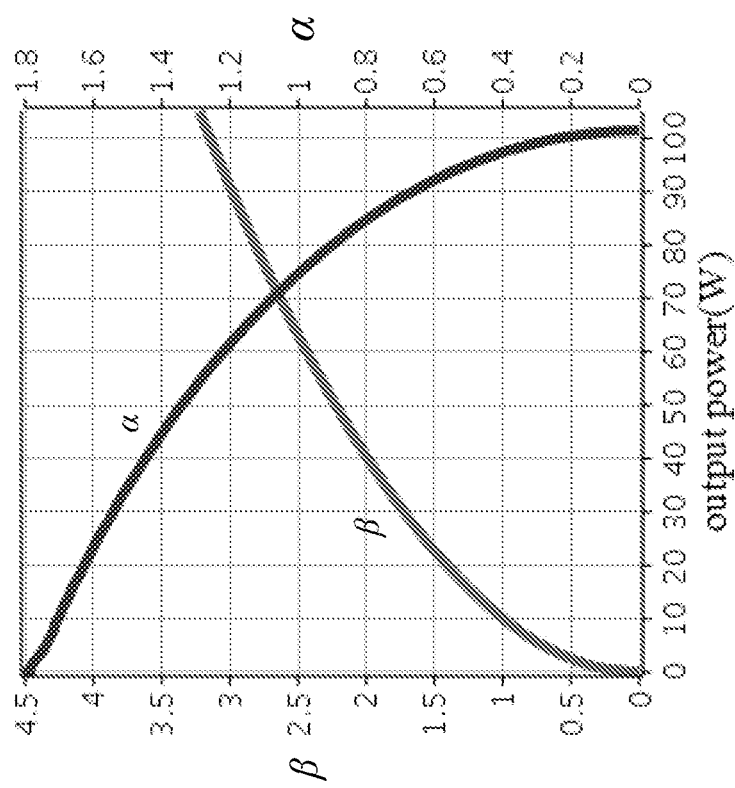
FIG. 9 illustrates trajectories of output power versus control variables according to a control objective of the transmitter in FIG. 4.

For example, in one embodiment, the control angles $α_+$ and $α_-$ may be set equal to a control angle α, i.e., $α_+=α_-=α$. For a desired constant bus voltage $V_{bus}$ and a fixed resistance $R_{load}$, the output power $P_o$ then becomes a function of the control angle α and the period β. As a result, the trajectory of the output power $P_o$ versus the period β to maintain a constant bus voltage $v_{bus}$ may be illustrated as in FIG. 9. Correspondingly, the trajectory the output power $P_o$ versus the control angle α may be obtained, as also illustrated in FIG. 9. As described above, the rectifier on-time period β is implemented to maintain a constant bus voltage $V_{bus}$ with changing output power $P_o$, and the control angle α is used to control the output power $P_o$. In this embodiment, the load resistance $R_{load}$ is fixed, and output power is changed along with the load current $i_{load}$.

Figure 10:
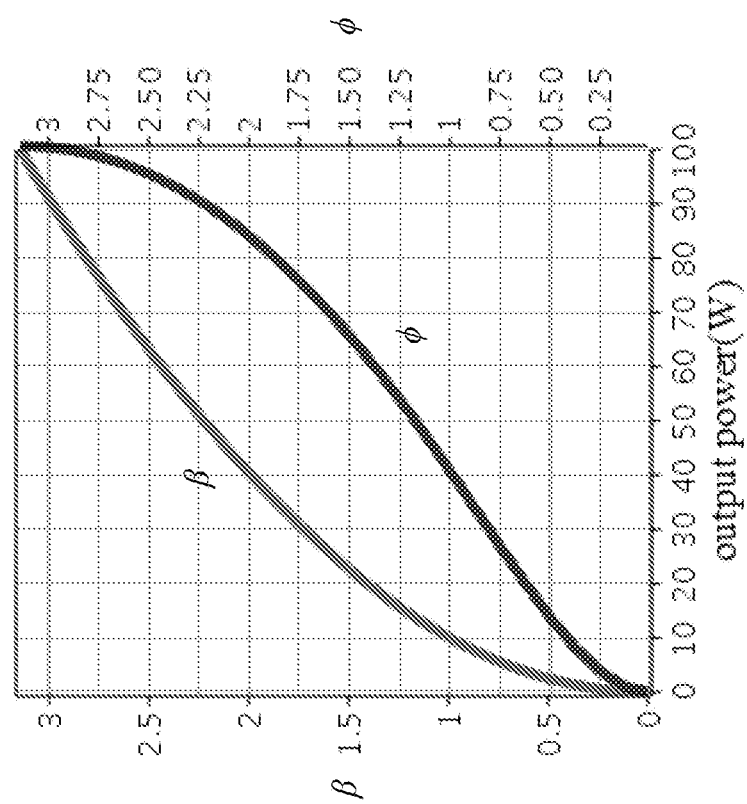
FIG. 10 illustrates trajectories of output power versus control variables according to another control objective of the transmitter in FIG. 4.

In another embodiment, the phase shift φ may be controlled such that $α_+=β-φ$, and $α_-=2π-β-φ$, in which case another control trajectory may be obtained, as shown in FIG. 10. In this embodiment, the load resistance $R_{load}$ is reduced proportionally with decreasing output power $P_o$. In other words, the load current may be controlled to be constant such that the transmitter 400 is operated as a constant current source.

Thus, by defining different relations between the control angles $α_+$ and $α_-$, different control trajectories may be devised based on the desired type of output power regulation. These control trajectories may be stored in the memory of the controller 450 in form of lookup tables and/or functions that may be invoked by the microprocessor to determine the control parameters $α_+$ and $α_-$, β, and/or φ based on the desired control objective and the output power $P_o$ requirement to generate the gate signals $G_{M1}$-$G_{M4}$.

Power Loss Model

Since soft switching of the transistors $M_1$-$M_4$ reduces or eliminates switching losses, the main power losses in the transmitter 400 are conduction losses of the transistors $M_1M_4$ and the diodes $D_1$ and $D_2$, and core losses and copper losses of the inductors $L_b$, $L_{aux1}$, and $L_{aux2}$.

To estimate the overall power loss of the transmitter 400, the currents $i_{Lb}$, $L_{aux1}$, $i_{aux2}$ and $i_{Load}$ may be derived mathematically as in equations (16)-(18), where $t_{on}$ represents a time during one switching period $T_s$ at which operation switches from the pair of transistors $M_1$ and $M_3$ to the pair of transistors $M_2$ and $M_4$. Equation (17) applies to either the current $i_{aux1}(t)$ or the current $i_{aux2}(t)$ and the corresponding inductors $L_{aux1}$ or $L_{aux2}$.

$$i_{Lb}(t) = \begin{cases} \frac{v_{in}(t) \cdot t}{L_b} & t < t_{on} \\ -\frac{V_{bus} - v_{in}(t)}{L_b} \cdot t + \frac{V_{bus} \cdot T_s \cdot d}{L_b} & t_{on} \le t \le T_s \end{cases} \quad (16)$$

$$i_{aux}(t) = \begin{cases} \frac{V_{bus} \cdot (1-d)}{L_{aux}} \cdot \left(t - \frac{T_s \cdot d}{2}\right) & t < t_{on} \\ -\frac{V_{bus} \cdot (1-d)}{L_{aux}} \cdot \left(t - \frac{T_s \cdot d}{2}\right) & t_{on} \le t \le T_s \end{cases} \quad (17)$$

$$i_{load}(t) = \frac{V_{ab1}}{R_{load}} \cdot \sin(2\pi f_s \cdot t) \quad (18)$$

Figure 11B:
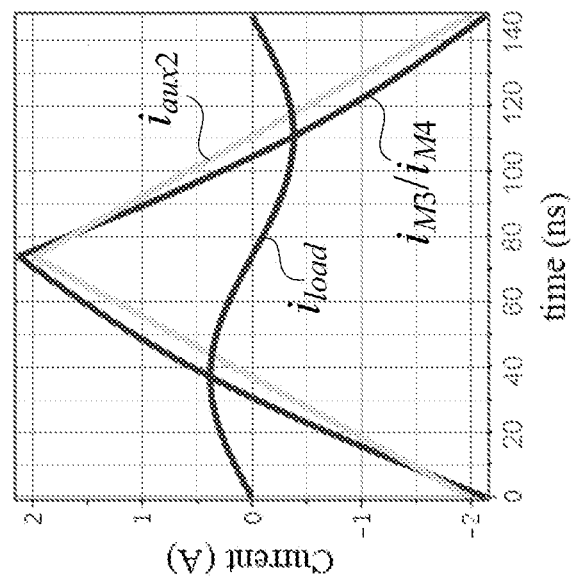
FIGS. 11A and 11B illustrate theoretical current waveforms for the transmitter in FIG. 4.
Figure 11A:
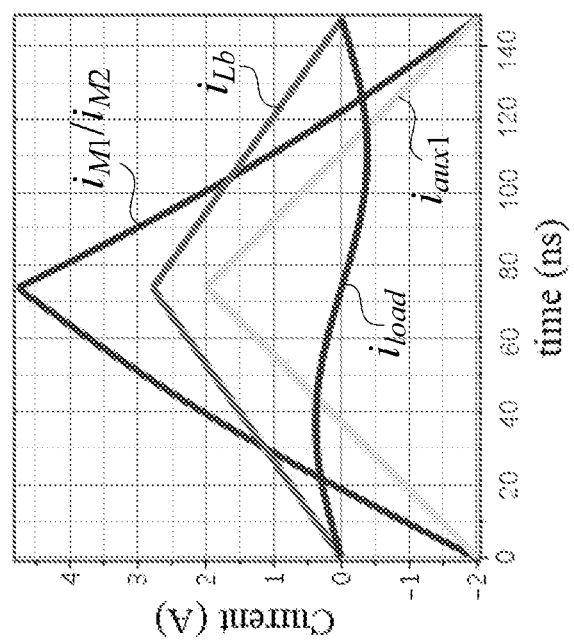

FIG. 11A illustrates the currents $i_{Lb}$, $i_{aux1}$, $i_{Load}$, and the current flowing through either MOSFET $M_1$ (i.e., $i_{M1}$) or $M_2$ (i.e., $i_{M2}$) over one switching period $T_s$. Either of the currents $i_{M1}$ and is the sum of the currents $i_{Lb}$, $i_{aux1}$, and $i_{Load}$. FIG. 11B illustrates the currents $i_{aux2}$, $i_{Load}$, and the current flowing through either MOSFET $M_3$ (i.e., $i_{M3}$) or $M_4$ (i.e., $i_{M4}$). Either of the currents $i_{M3}$ and $i_{M4}$ is the sum of $i_{aux2}$ and $i_{aux2}$. Currents in $D_1$ and $D_2$ are equal to $i_{Lb}$.

Inductor losses may be estimated based on core losses and copper losses. Core losses may be calculated using the iGSE method, which is described in "Measurement and loss model of ferrites with non-sinusoidal waveforms," by A. Van den Bossche et al., *Power Electronics Specialists Conference*, vol. 6, no. 2, 4814-4818, June 2004. Copper losses consist of DC copper losses and high-frequency AC copper losses resulting from skin effect and proximity effect. Copper losses may be calculated following analytical methods that are well known in the art.

Figure 12:
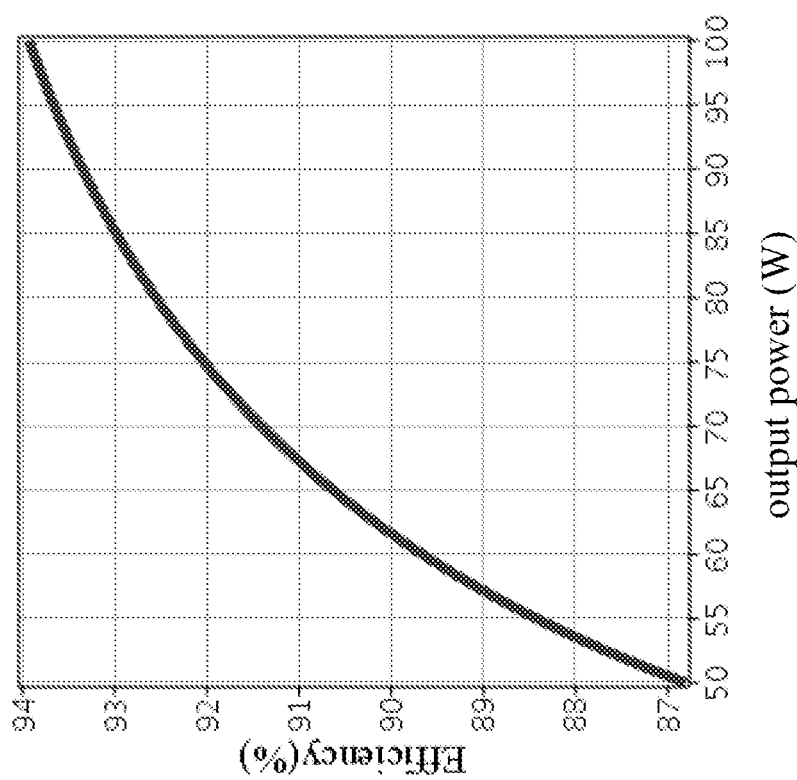
FIG. 12 is a plot of the estimated power efficiency curve of the transmitter in FIG. 4.

FIG. 12 is a plot of the estimated power efficiency curve of the transmitter 400.

Experimental Verification

Figure 13:
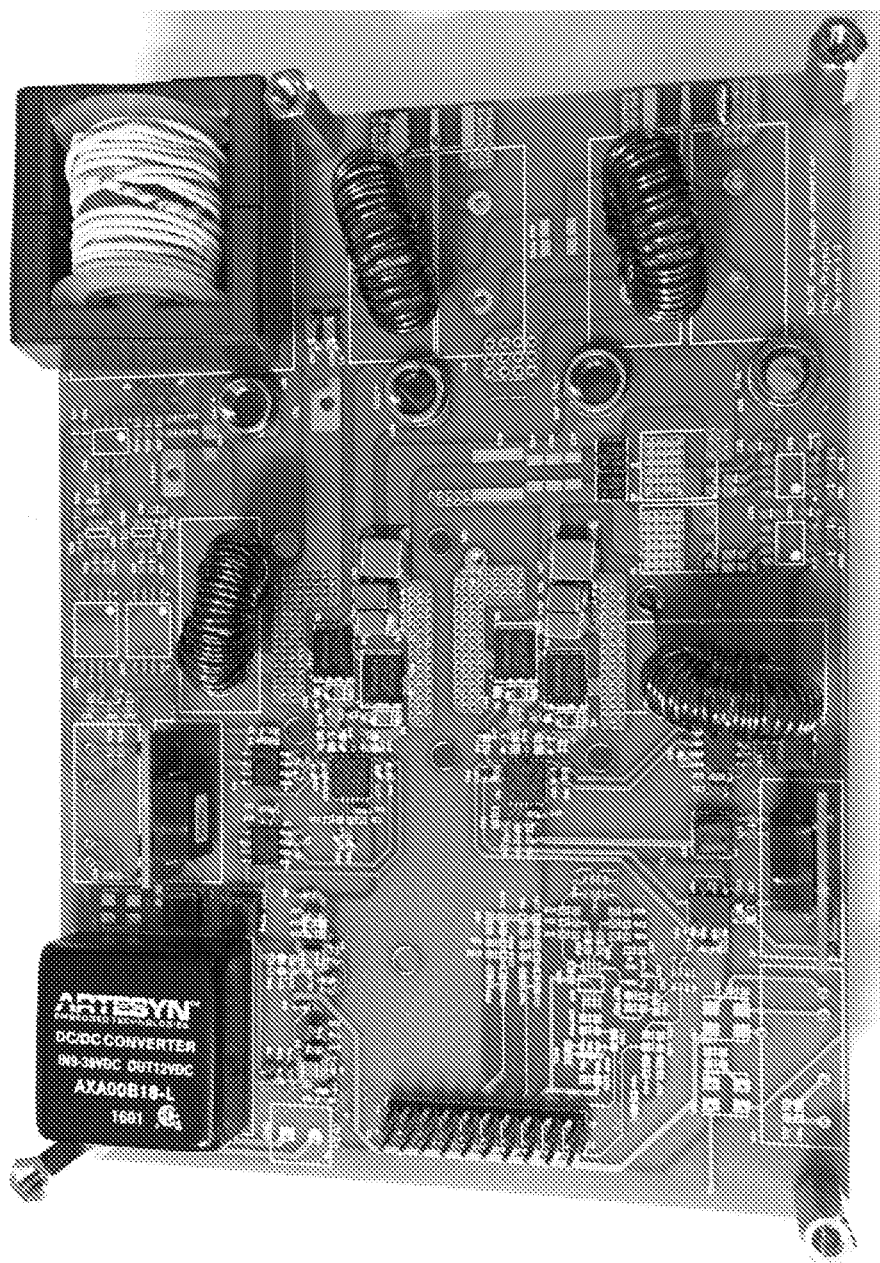
FIG. 13 illustrates a prototype of the transmitter in FIG. 4.

FIG. 13 illustrates a 100-W prototype of the transmitter 400, according to an embodiment of the present disclosure. The main design parameters and components of the prototype are listed in Table 1.

TABLE I

| Description | Symbol | Value/Component |
|---|---|---|
| Input Voltage | $V_i$ | 120 V/60 Hz |
| Bus Voltage | $V_{bus}$ | 340 V |
| Power Rating | $P_o$ | 100 W |
| Switching Frequency | $f_s$ | 6.78 MHz |
| Transistors | $M_1$-$M_4$ | GaNFETs (NV6131) |
| Diodes | $D_1$-$D_2$ | C3D1P7060Q |
| Digital Signal Processor | DSP | TMS320F28377S |

Figure 14:
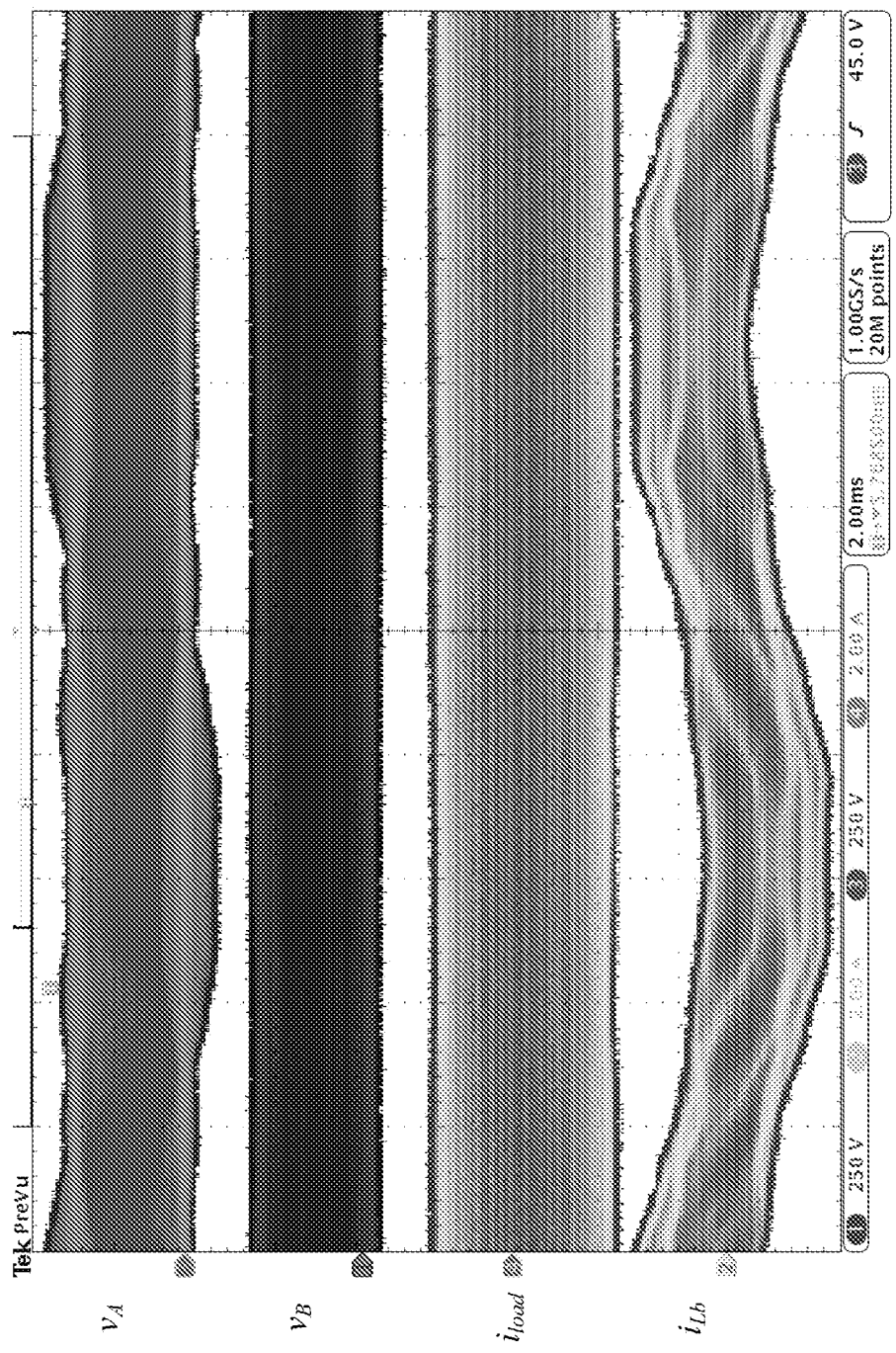
FIGS. 14 and 15 show scope captures of voltage and current waveforms from the prototype in FIG. 13 at full power.
Figure 15:
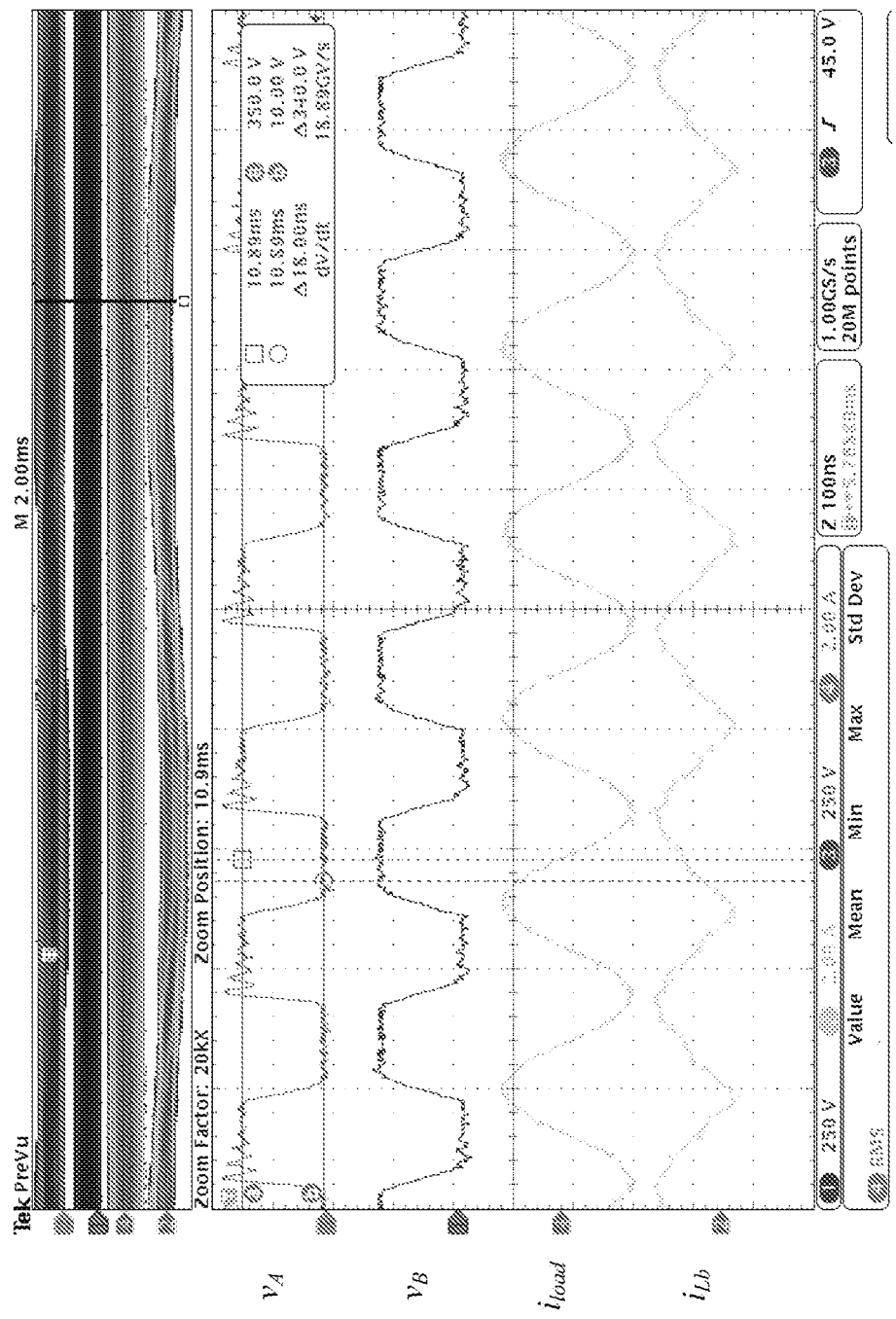

FIGS. 14 and 15 show scope captures of waveforms of voltages at the phase legs A and B (i.e., $V_A$ and $V_B$), the load current $i_{Load}$, and the inductor current $i_{Lb}$ under full power operation, with $v_{in}$=120 Vrms/60 Hz, $V_{bus}$=340 V, P=100 W, $f_s$=6.78 MHz, β=π, $α_+=α_-=α=0$). FIG. 14 shows the waveforms over one line period (i.e., 1/60 s). FIG. 15 shows the waveforms over several switching periods $T_s$. The waveforms of the voltages $V_A$ and $v_B$ demonstrate that both phase legs A and B achieve soft switching. The load current $i_{Load}$ is sinusoidal with minimal distortion.

The difference between the experimental waveform of the inductor current $i_{Lb}$ in FIG. 15 and the ideal waveform in FIG. 8 may be explained by the waveforms in FIGS. 16A and 16B. FIG. 16A illustrates a typical DCM inductor current waveform, when diode capacitances are included. When the inductor current $i_{Lb}$ decreases to zero, the junction capacitance of the two diodes ($D_1$, $D_2$) resonates with the inductor $L_b$. If the off time $t_0$ of the diodes is much greater than the period $t_r$ of this resonance, the ringing damps out after several resonant periods due to series resistance in the circuit, as shown in FIG. 16A. However, if $t_r > 2t_0$, for example, the waveform takes the shape shown in FIG. 16B, which very likely corresponds to the experimental waveform in FIG. 15.

Figure 17:
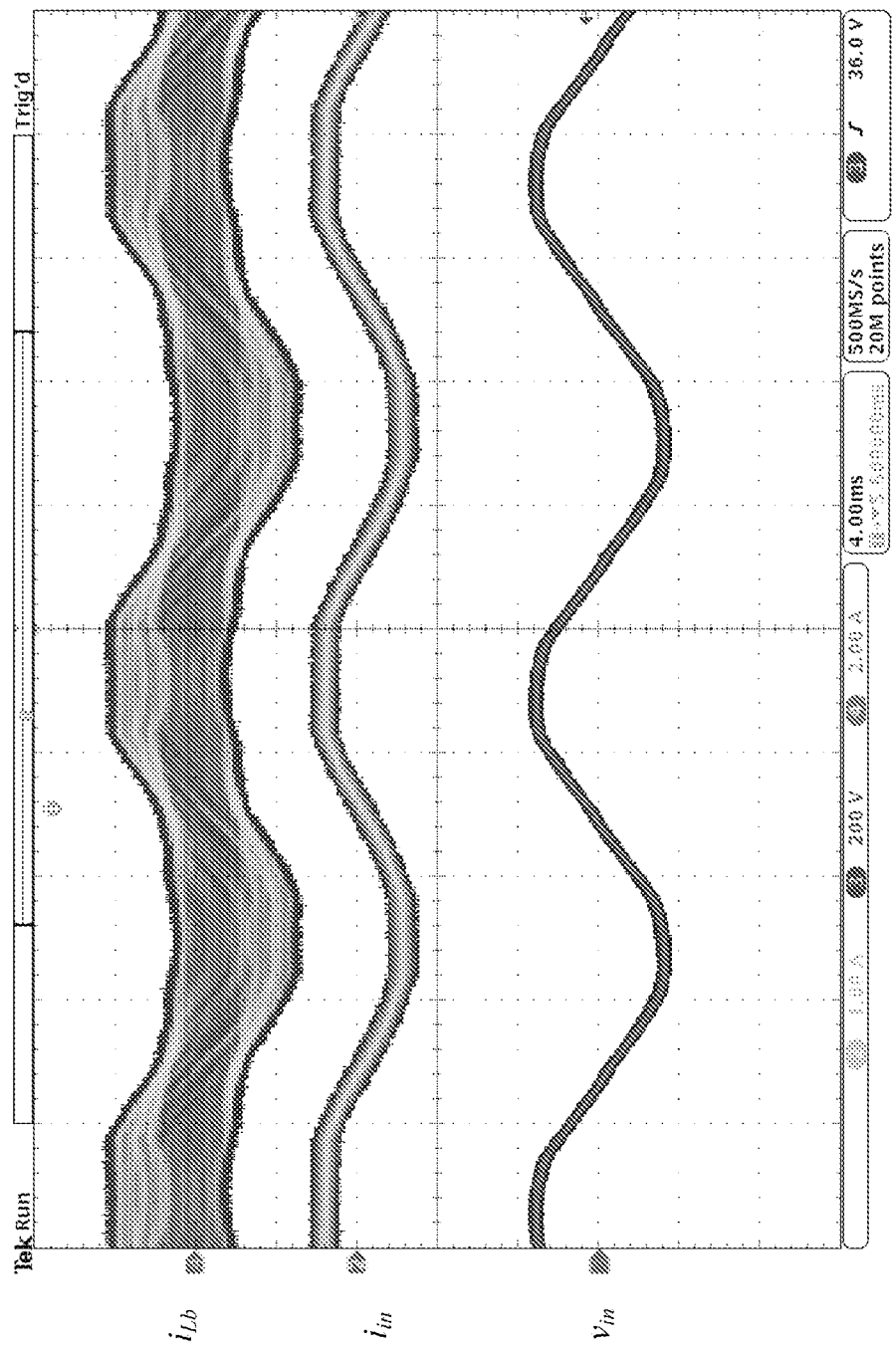
FIG. 17 shows scope captures of voltage and current waveforms from the prototype in FIG. 13 at full power.

FIG. 17 shows a scope capture of waveforms of the inductor current $i_{Lb}$, input current $i_{in}$, and the input voltage $v_{in}$ at full power. The THD of input current $i_{in}$ was measured to be 15% and the PF was measured to be 0.99. As described above, the THD is limited by the modulation index M which is set to 2 in this experimental setup. With larger M, the THD may be improved. However, a larger M would increase voltage stress on the switches due to larger bus voltage $V_{bus}$.

Figure 18:
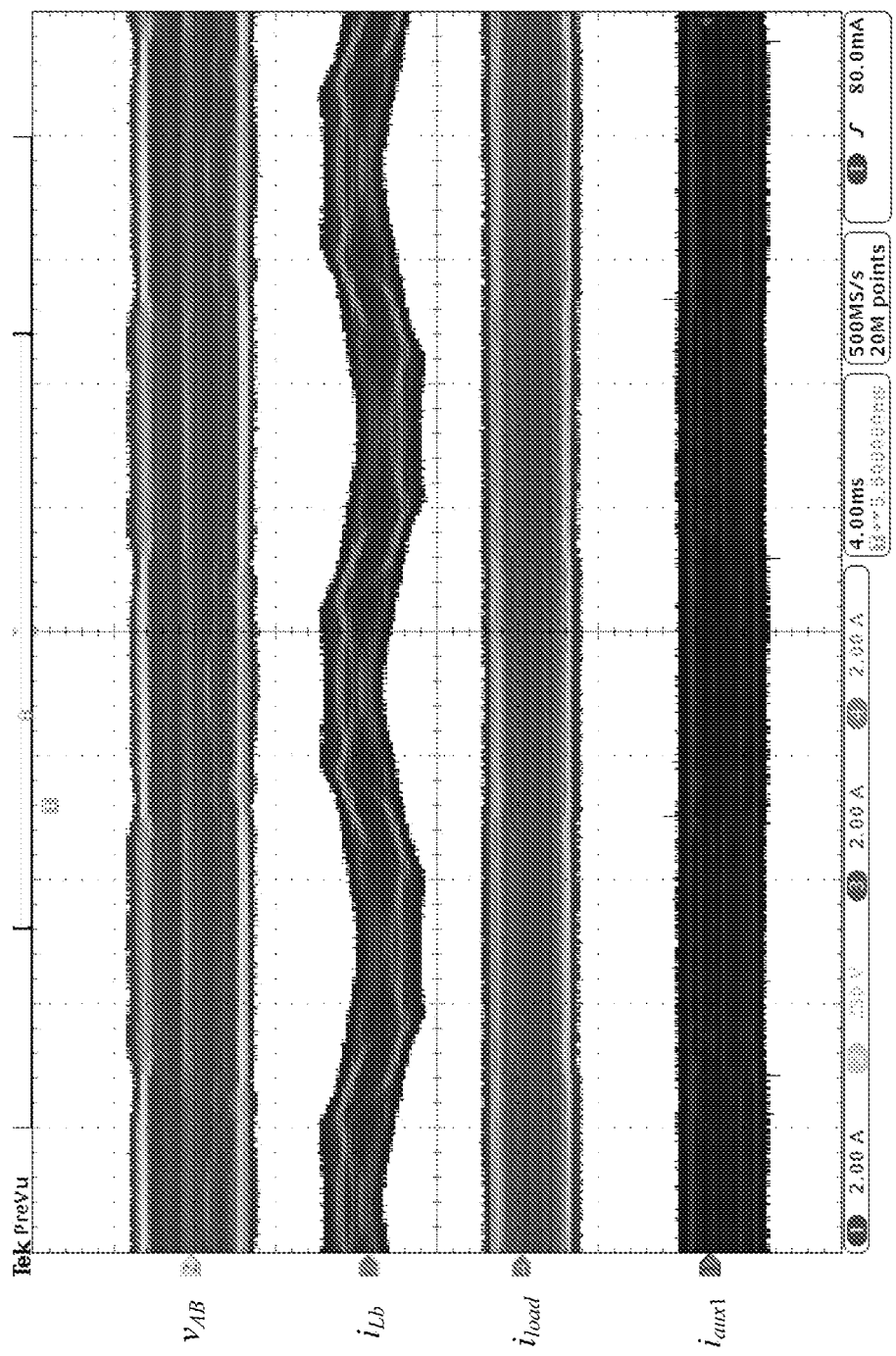
FIGS. 18 and 19 show scope captures of voltage and current waveforms from the prototype in FIG. 13 under light load condition.
Figure 19:
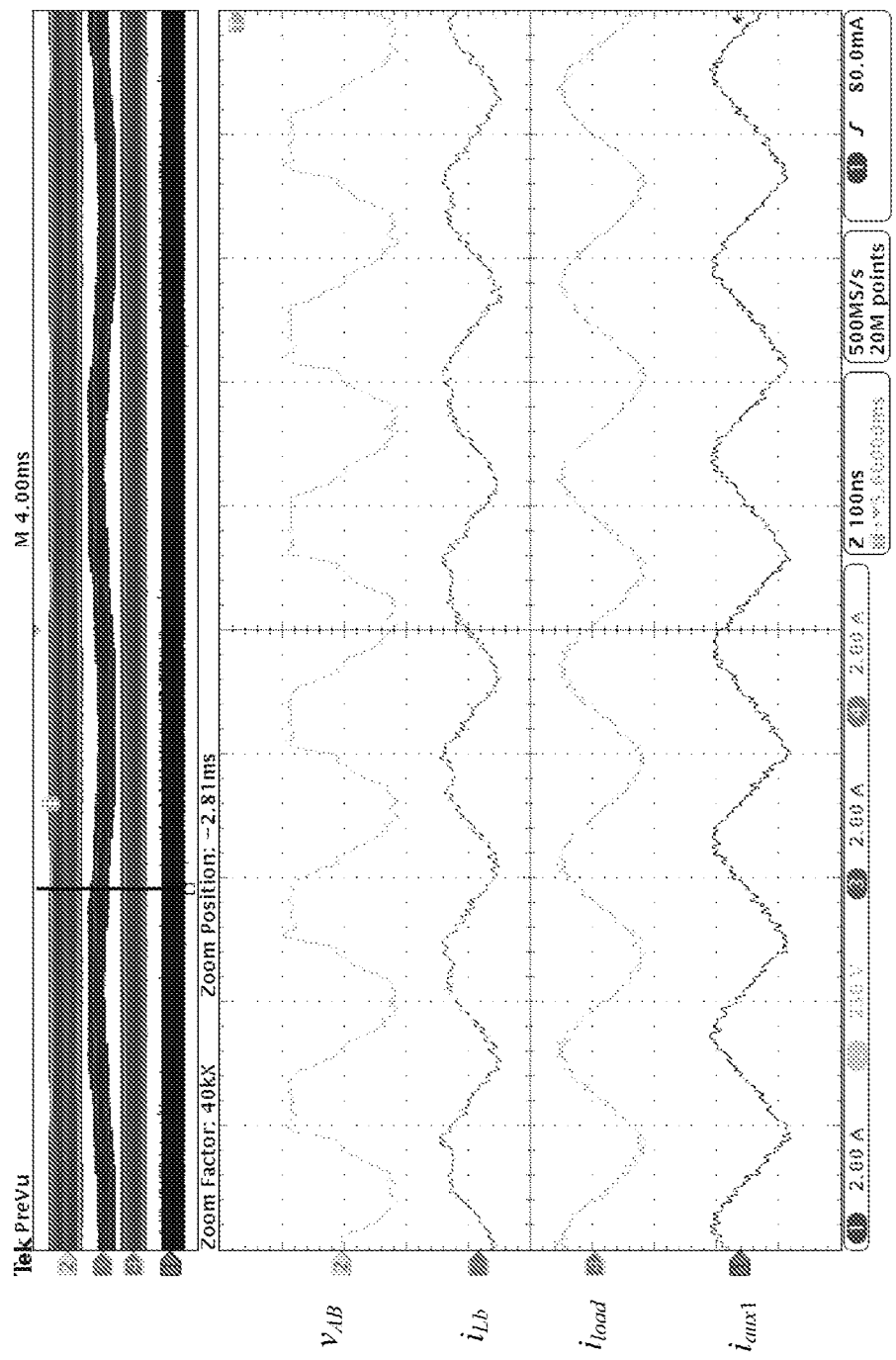

FIGS. 18 and 19 show scope captures of waveforms of the voltage v across the two phase legs A and B, the inductor current $i_{Lb}$, the load current and the current $i_{aux1}$ under light load condition, with $v_{in}$=85.5 Vrms/60 Hz, $V_{bus}$=207 V, $P_o$=22 W, $f_s$=6.78 MHz, $\beta=0.9\pi$, $\alpha_+=\alpha_-=\alpha=0.33\pi$). FIG. 18 shows the waveforms over one line period. FIG. 19 shows waveforms over several switching periods. From the waveforms, it can be observed that ZVS operation is achieved and the inductor current $i_{Lb}$, the load current $i_{load}$, and the current $i_{aux1}$ match the theoretical waveforms described above.

The power efficiency at full load ($P_o$=100 W) is 92.1%. This power efficiency is lower than the estimated 94% of FIG. 12. This discrepancy may result from body diode conduction in the phase leg A. As the waveforms in FIG. 15 show, there is a significant difference in the resonant ZVS intervals of each phase leg due to the extra current in phase leg A contributed by the boost inductor $L_b$. This extra current results in a short (roughly 20 ns) period of body diode conduction, resulting in additional power losses. Despite the additional losses, the efficiency of the prototype of the transmitter 400 is higher than the measured efficiency of a comparable two-stage prototype previously demonstrated in "A GaN-based 100 W Two-Stage Wireless Power Transmitter with Inherent Current Source Output," by J. Liang et al., 2016 *IEEE PETS Workshop on Emerging Technologies: Wireless Power Transfer (WoW)*. Knoxville, Tenn., 2016, pp. 65-72.

Embodiments of the disclosure are specifically illustrated and/or described herein. However, it will be appreciated that modifications and variations of the disclosure are covered by the above teachings and within the purview of the appended claims without departing from the spirit and intended scope of the disclosure. Further variations that are consistent with the principles described above are permissible.

What is claimed is:

1. A single-stage transmitter for wireless power transfer, comprising:
   an input port;
   first, second, and third legs, each including two switches connected in series;
   a rectifier stage including the first and second legs, and a boost inductor coupling the first and second legs to the input port;
   an inverter stage including the second and third legs;
   an output port coupled to the second and third legs;
   a bus capacitor coupled across the first, second, and third legs;
   a zero voltage switching tank, wherein the tank includes:
      fourth and fifth legs coupled across the bus capacitor, each leg including two capacitors connected in series;
      a first auxiliary inductor coupling the fourth leg to the second leg; and
      a second auxiliary inductor coupling the fifth leg to the third leg; and
   a controller programmed to determine first and second parameters, based on an output power at the output port, to simultaneously control the rectifier stage and the inverter stage.

2. The single-stage transmitter of claim 1, wherein the controller is programmed to operate the rectifier stage in discontinuous conduction mode.

3. The single-stage transmitter of claim 1, wherein the switches in the first leg are diodes.

4. The single-stage transmitter of claim 1, wherein the switches in the second and third legs are transistors.

5. The single-stage transmitter of claim 1, wherein, based on the first and second parameters, the controller is programmed to generate gate signals for each of the switches in the second and third legs.

6. The single-stage transmitter of claim 1, wherein the first parameter controls an on-time of the rectifier stage to keep a voltage across the bus capacitor constant when the output power changes.

7. The single-stage transmitter of claim 1, wherein the second parameter controls the inverter stage to provide the output power.

8. The single-stage transmitter of claim 1, wherein a ratio of a voltage across the bus capacitor and a magnitude of an input voltage across the input port is set to 2.

9. A method of controlling a single-stage transmitter for wireless power transfer, comprising:
   determining first and second parameters, by a controller of the transmitter and based on an output power at an output port of the transmitter, to simultaneously control a rectifier stage and an inverter stage of the transmitter;
   generating, by the controller and based on the first and second parameters, four gate signals for first, second, third, and fourth switches of the transmitter; and
   switching each of the first, the second, the third, and the fourth switches with the four gate signals, respectively,
   wherein the transmitter comprises:
      a first leg including fifth and sixth switches connected in series,
      a second leg including the first and the second switches connected in series and coupled to the output port, the second leg being shared by the rectifier stage and the inverter stage,
      a third leg including the third and the fourth switches connected in series and coupled to the output port,
      a boost inductor coupling the first and second legs to an input port of the transmitter,
      a bus capacitor coupled across the first, second, and third legs;
      a zero voltage switching tank, wherein the tank includes:

fourth and fifth legs coupled across the bus capacitor, each leg including two capacitors connected in series;
a first auxiliary inductor coupling the fourth leg to the second leg; and
a second auxiliary inductor coupling the fifth leg to the third leg.

10. The method of claim 9, further comprising operating the rectifier stage in discontinuous conduction mode.

11. The method of claim 9, wherein the first parameter controls an on-time of the rectifier stage to keep a voltage across the bus capacitor constant when the output power changes.

12. The method of claim 9, wherein the second parameter controls the inverter stage to provide the output power.

13. The method of claim 9, further comprising setting a ratio of a voltage across the bus capacitor and a magnitude of an input voltage across the input port to 2.

14. A non-transitory computer readable medium storing computer instructions executable by a controller controlling a transmitter for wireless power transfer to perform operations comprising:
determining first and second parameters, by a controller of the transmitter and based on an output power at an output port of the transmitter, to simultaneously control a rectifier stage and an inverter stage of the transmitter;
generating, by the controller and based on the first and second parameters, four gate signals for first, second, third, and fourth switches of the transmitter; and
switching each of the first, the second, the third, and the fourth switches with the corresponding gate signal, wherein the transmitter comprises:
a first leg including fifth and sixth switches connected in series,
a second leg including the first and the second switches connected in series and coupled to the output port, the second leg being shared by the rectifier stage and the inverter stage,
a third leg including the third and the fourth switches connected in series and coupled to the output port,
a boost inductor coupling the first and second legs to an input port of the transmitter,
a bus capacitor coupled across the first, second, and third legs; and
a zero voltage switching tank, wherein the tank includes:
fourth and fifth legs coupled across the bus capacitor, each leg including two capacitors connected in series;
a first auxiliary inductor coupling the fourth leg to the second leg; and
a second auxiliary inductor coupling the fifth leg to the third leg.

15. The non-transitory computer readable medium of claim 14, wherein the operations further comprise operating the rectifier stage in discontinuous conduction mode.

16. The non-transitory computer readable medium of claim 14, wherein the first parameter controls an on-time of the rectifier stage to keep a voltage across the bus capacitor constant when the output power changes.

17. The non-transitory computer readable medium of claim 14, wherein the second parameter controls the inverter stage to provide the output power.

18. The non-transitory computer readable medium of claim 14, wherein the operations further comprise setting a ratio of a voltage across the bus capacitor and a magnitude of an input voltage across the input port to 2.

* * * * *

UNITED STATES PATENT AND TRADEMARK OFFICE
CERTIFICATE OF CORRECTION

Page 1 of 2

PATENT NO. : 11,011,936 B2
APPLICATION NO. : 16/483287
DATED : May 18, 2021
INVENTOR(S) : Costinett et al.

It is certified that error appears in the above-identified patent and that said Letters Patent is hereby corrected as shown below:

On the Title Page

Item (57) ABSTRACT, Page 2, Column 1, Line 1: Please correct "maintain constant" to read -- maintain a constant --

In the Specification

Column 4, Line 58: Please correct "node F" to read -- node E --

Column 4, Line 61: Please correct "inductor and" to read -- inductor $L_{aux1}$ and --

Column 4, Line 65: Please correct "capacitor C" to read -- capacitor $C_{bus}$ --

Column 5, Lines 7-8: Please correct "inductor current the bus" to read -- inductor current $i_{Lb}$, the bus --

Column 6, Line 16: Please correct "current may" to read -- current $i_{in}$ may --

Column 6, Lines 43-44: Please correct "current respectively" to read -- current $i_{in}$, respectively --

Column 6, Line 64: Please correct "current and" to read -- current $i_{in}$ and --

Column 7, Line 61: Please correct "voltage G constant" to read -- voltage $V_{bus}$ constant --

Column 8, Line 17: Please correct "$G_{M1}$-$G_4$" to read -- $G_{M1}$-$G_{M4}$ --

Column 8, Line 17: Please correct "$V_{AB}$" to read -- $v_{AB}$ --

Column 9, Line 13: Please correct "voltage input" to read -- voltage $V_{bus}$, input --

Signed and Sealed this
Twelfth Day of July, 2022

Katherine Kelly Vidal
*Director of the United States Patent and Trademark Office*

CERTIFICATE OF CORRECTION (continued)
U.S. Pat. No. 11,011,936 B2

Column 9, Line 18: Please correct "period 13" to read -- period $\beta$ --

Column 9, Line 20: Please correct "⊕" to read -- $\alpha$ --

Column 9, Line 34: Please correct "$v_{bus}$" to read -- $V_{bus}$ --

Column 9, Line 48: Please correct "current may" to read -- current $i_{load}$ may --

Column 9, Line 66: Please correct "$M_1M_4$" to read -- $M_1$-$M_4$ --

Column 10, Line 2: Please correct "$L_{aux1}$" to read -- $i_{aux1}$ --

Column 10, Lines 30-31: Please correct "$i_{aux2}$ and $i_{aux2}$." to read -- $i_{aux2}$ and $i_{Load}$. --

Column 10, Line 63: Please correct "$V_A$ and $V_B$" to read -- $v_A$ and $v_B$ --

Column 10, Line 64: Please correct "$i_{Load}$" to read -- $i_{load}$ --

Column 10, Line 65: Please correct "P=100" to read -- $P_o$=100 --

Column 11, Line 2: Please correct "$V_A$" to read -- $v_A$ --

Column 11, Line 28: Please correct "voltage v across" to read -- voltage $v_{AB}$ across --

Column 11, Line 29: Please correct "current and" to read -- current $i_{load}$, and --